(12) United States Patent
Huang et al.

(10) Patent No.: US 10,273,997 B2
(45) Date of Patent: Apr. 30, 2019

(54) AXIALLY-SWITCHABLE QUICK RELEASE DEVICE

(71) Applicant: J. D COMPONENTS CO., LTD., Chang Hua Hsien (TW)

(72) Inventors: Chun-Wei Huang, Changhua County (TW); Chen-Kuie Liu, Changhua County (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 124 days.

(21) Appl. No.: 15/286,125

(22) Filed: Oct. 5, 2016

(65) Prior Publication Data

US 2017/0174287 A1    Jun. 22, 2017

(30) Foreign Application Priority Data

Dec. 21, 2015  (TW) .............................. 104220462 U

(51) Int. Cl.
*F16B 7/04* (2006.01)
*B62K 25/02* (2006.01)
*B60B 27/02* (2006.01)

(52) U.S. Cl.
CPC ............ *F16B 7/042* (2013.01); *B60B 27/026* (2013.01); *B62K 25/02* (2013.01); *B62K 2025/025* (2013.01); *B62K 2206/00* (2013.01); *Y10T 403/595* (2015.01)

(58) Field of Classification Search
CPC ............... Y10T 403/10; Y10T 403/592; Y10T 403/595; Y10T 403/599; Y10T 403/602; Y10T 403/604; Y10T 403/7015; F16B 2/18; F16B 2/185; F16B 7/042; F16B 21/165; B60B 27/023; B60B 27/026; B60B 27/02; B60B 27/06; B60B 37/10; B62K 25/02; B62K 2025/025; B62K 2206/00
USPC ..... 403/1, 322.2, 322.4, 325, 327, 328, 353; 301/124.2, 111.01, 111.03, 111.06, 121
See application file for complete search history.

(56) References Cited

U.S. PATENT DOCUMENTS

| | | | | |
|---|---|---|---|---|
| 4,598,614 A | * | 7/1986 | Kipp ........................ | G05G 1/12 81/58.3 |
| 4,964,287 A | * | 10/1990 | Gaul ...................... | B62H 5/001 224/924 |
| 5,533,232 A | * | 7/1996 | Boyer ...................... | B25B 5/16 16/402 |

(Continued)

*Primary Examiner* — Josh Skroupa
*Assistant Examiner* — Cory B Siegert
(74) *Attorney, Agent, or Firm* — Muncy, Geissler, Olds & Lowe, P.C.

(57) ABSTRACT

An axially-switchable quick release device, including: a rod extending in an axial direction; a clutch shaft disposed at an end of the rod and having a meshing teeth portion and an idling ring portion; and a quick release lever having a fitting portion and a turning portion connected to the fitting portion The fitting portion has a fitting teeth portion sleeved onto the clutch shaft and movable along the axial direction and between a meshing position and an idling position. When the quick release lever is at the meshing position, the fitting teeth portion engages with the meshing teeth portion so that the quick release lever and the clutch shaft can rotate synchronously. When the quick release lever is at the idling position, the fitting teeth portion moves to the idling ring portion so that the quick release lever can rotate freely relative to the clutch shaft.

5 Claims, 3 Drawing Sheets

(56) References Cited

U.S. PATENT DOCUMENTS

| | | | | |
|---|---|---|---|---|
| 5,879,100 | A * | 3/1999 | Winkler | F16D 1/12 |
| | | | | 16/422 |
| 8,186,768 | B2 * | 5/2012 | Spahr | B62K 25/02 |
| | | | | 301/110.5 |
| 9,616,963 | B2 * | 4/2017 | Walthert | B62K 25/02 |
| 2012/0161503 | A1 * | 6/2012 | Achenbach | B62K 25/02 |
| | | | | 301/124.2 |
| 2015/0054254 | A1 * | 2/2015 | Spahr | B62K 25/02 |
| | | | | 280/278 |
| 2015/0069827 | A1 * | 3/2015 | Nakajima | B62K 25/02 |
| | | | | 301/124.2 |

* cited by examiner

AXIALLY-SWITCHABLE QUICK RELEASE DEVICE

BACKGROUND OF THE INVENTION

1. Field of the Invention

The present invention relates to quick release device for bicycle and, more particularly, to a quick release device for installing and removing wheels or other components quickly.

2. Description of the Prior Art

In the erstwhile, bicycle was regarded as a tool for transportation and its design focused on durability. Recently, due to changes in rider habits, bicycle design attaches importance to a quick release device. Thus, a user can install and remove components such as front and rear wheels easily and quickly, facilitating carrying the bicycle on a vehicle or a means of public transportation and reinstalling each of the components easily when the user needs to use the bicycle. Hence, the quick release device enables diverse use of the bicycle.

A conventional quick release device comprises a rod inserted into an axle of a wheel of a bicycle, a nut fastened to one end of the rod, and a quick release lever which is fixed to the other end of the rod and turnable as needed. To operate the quick release device, a user can turn the quick release lever to reduce the distance between the nut and the quick release lever to a predetermined clamping length, and then the user can further rotates a camshaft of the quick release lever to generate a clamping force. However, the predetermined clamping length is difficult to know by observation or experience; instead, it can only be inspected by rotating the camshaft. As a result, the user usually has to rotate the camshaft anew several times until the correct clamping length, clamping force, and clamping position are attained.

SUMMARY OF THE INVENTION

In view of the aforesaid drawback, the objective of the present invention is to provide an axially-switchable quick release device which is easier to operate and adjust than a conventional quick release device.

To this end, an axially-switchable quick release device provided according to the present invention comprises: a rod extending in an axial direction; a clutch shaft disposed at an end of the rod and having a meshing teeth portion and an idling ring portion both of which disposed on an outer circumferential surface of the clutch shaft; and a quick release lever having a fitting portion and a turning portion connected to the fitting portion, the fitting portion having a fitting teeth portion, fitting teeth portion being sleeved onto the clutch shaft and movable along the axial direction between a meshing position and an idling position, wherein, when the quick release lever is at the meshing position, the fitting teeth portion of the fitting portion engages with the meshing teeth portion of the clutch shaft to allow the quick release lever and the clutch shaft to rotate synchronously about the axial direction; when the quick release lever is at the idling position, the fitting teeth portion of the fitting portion separates from the meshing teeth portion and moves to the idling ring portion to allow the quick release lever to rotate freely about the axial direction relative to the clutch shaft.

Given the aforesaid technical features of the axially-switchable quick release device of the present invention, when the quick release lever is at the meshing position, the user can rotate the quick release lever and therefore adjust the strength of a clamping force quickly and intuitively. After the strength of the clamping force has been adjusted appropriately, the user can switch the quick release lever to the idling position. At this point in time, the user can adjust the turning portion of the quick release lever to an appropriate orientation and position without affecting the strength of the clamping force. By contrast, a conventional quick release device is disadvantaged by the need to rotate an eccentric cam repeatedly to examine for an appropriate clamping length, clamping force, and clamping position. Therefore, the axially-switchable quick release device of the present invention is actually easier to operate and adjust.

Fine structures, features, assembly and use of the axially-switchable quick release device of the present invention are described hereunder. However, persons skilled in the art understand that the description and any specific embodiment of the present invention are illustrative of the present invention rather than restrictive of the claims of the present invention.

DETAILED DESCRIPTION OF THE EMBODIMENT OF THE INVENTION

The technical features of the present invention are illustrated with an embodiment, depicted by drawings, and described below.

Figure 1:
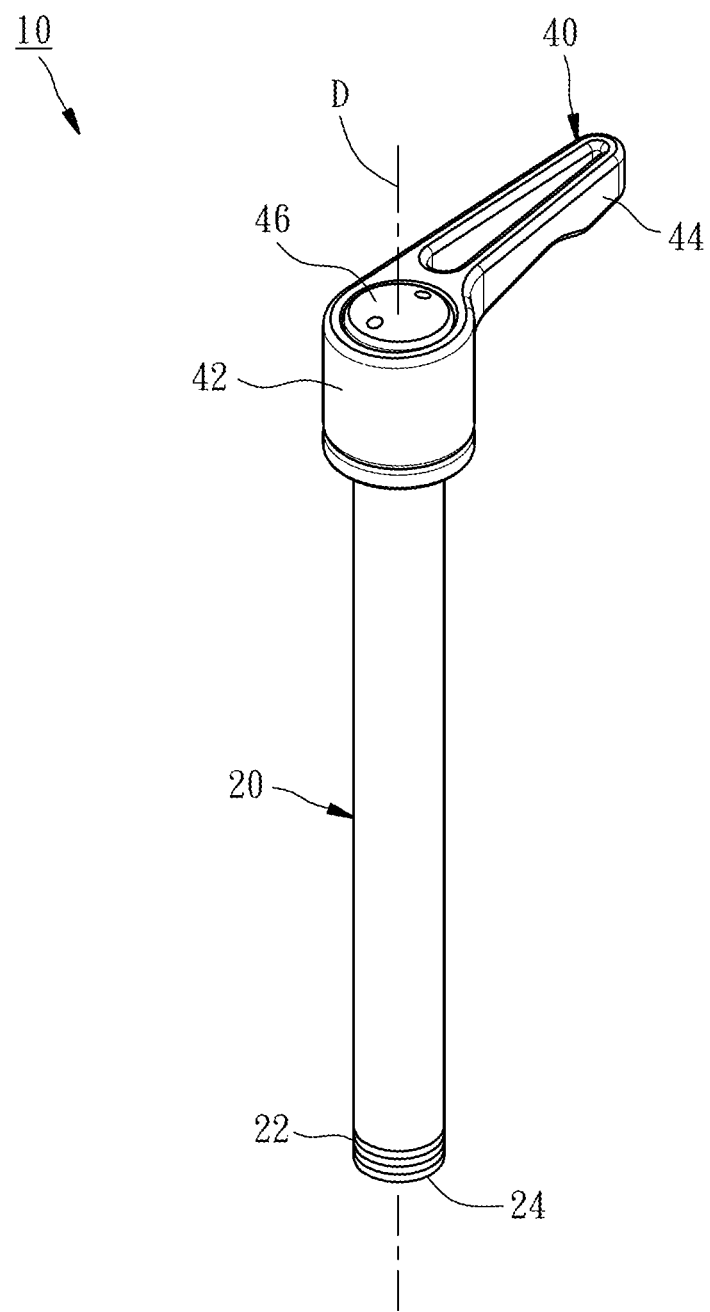
FIG. 1 is a perspective view of an axially-switchable quick release device according to an embodiment of the present invention.
Figure 2:
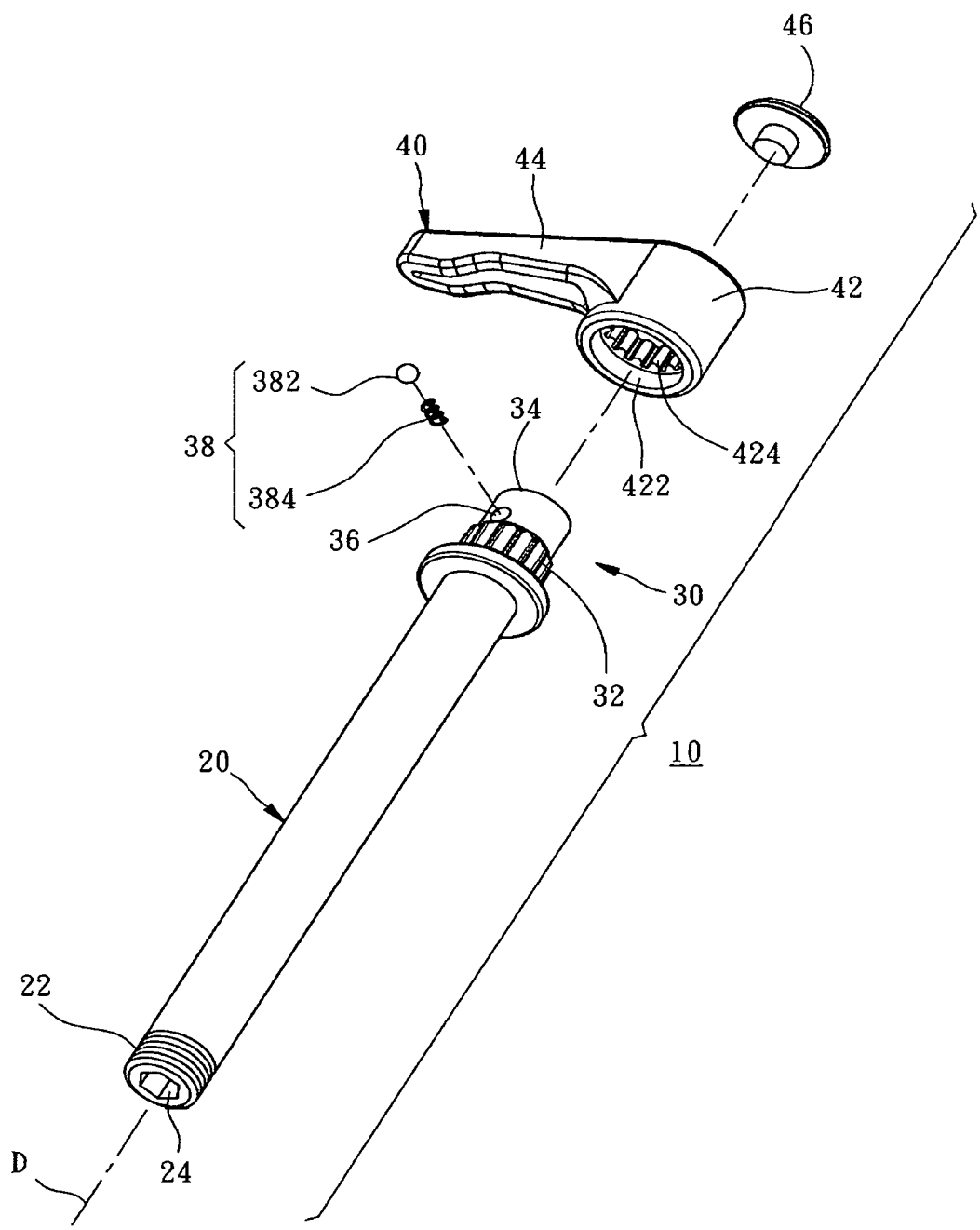
FIG. 2 is an exploded view of the axially-switchable quick release device according to the embodiment of the present invention.

Referring to FIGS. 1, 2, an axially-switchable quick release device 10 provided in the embodiment of the present invention essentially comprises a rod 20, a clutch shaft 30, and a quick release lever 40.

The rod 20 (skewer rod) extends in an axial direction D. A rod external thread 22 is disposed at one end of the rod 20. An axial hole 24 is centrally disposed at the abovesaid end of the rod 20 and extends inward in the axial direction D. In this embodiment, the axial hole 24 is a hexagonal axial hole for use with a hex key, but the present invention is not limited to a hexagonal axial hole. For example, the axial hole 24 can be a dodecagonal axial hole, provided that the axial hole 24 is engagable with a wrench element (not shown) which is therefore driven to rotate. The rod external thread 22 is used to mesh with a screw hole (not shown) of a front fork (or a rear fork) or a quick release nut (not shown).

The clutch shaft 30 is disposed at the other end of the rod 20 and opposed to the rod external thread 22. The clutch shaft 30 includes a meshing teeth portion 32, an idling ring portion 34, a limit slot 36, and a limit unit 38 all of which are disposed on an outer circumferential surface of the clutch shaft 30. The outer diameter of the idling ring portion 34 is less than the outer diameter of the meshing teeth portion 32. The limit slot 36 is disposed on (or between) the meshing teeth portion 32 and the idling ring portion 34 and extends inward in a radial direction of the rod 20. The limit unit 38 is received in the limit slot 36 compressedly in the radial direction of the rod 20. In this embodiment, the limit unit 38 comprises a ball 382 and an elastic element 384. The two ends of the elastic element 384 abut against the ball 382 and the bottom of the limit slot 36, respectively, such that the ball 382 can move along the radial direction of the rod 20 under an external force.

The quick release lever 40 has a fitting portion 42, a turning portion 44 connected to the fitting portion 42, and an engaging element 46. The fitting portion 42 has a fitting hole 422 penetrating in the axial direction D and a fitting teeth portion 424. The fitting teeth portion 424 is disposed on the peripheral wall of the fitting hole 422. The fitting portion 42 is movable in the axial direction D and between a meshing position P1 and an idling position P2 while being sleeved onto the clutch shaft 30. The engaging element 46 has one end fixed to the clutch shaft 30.

When the fitting portion 42 of the quick release lever 40 is at the meshing position P1, the fitting teeth portion 424 of the fitting portion 42 engages with the meshing teeth portion 32 of the clutch shaft 30 to allow the quick release lever 40 and the clutch shaft 30 to rotate synchronously about the axial direction D; meanwhile, the upper edge (shown in FIG. 3) of the fitting teeth portion 424 of the fitting portion 42 gets engaged with the ball 382 of the limit unit 38 of the clutch shaft 30. When the fitting portion 42 of the quick release lever 40 is switched to the idling position P2, the fitting teeth portion 424 of the fitting portion 42 separates from the meshing teeth portion 32 of the clutch shaft 30 and moves to the idling ring portion 34 to allow the quick release lever 40 to rotate freely about the axial direction D relative to the clutch shaft 30; meanwhile, the upper edge and lower edge (shown in FIG. 4) of the fitting teeth portion 424 get engaged with the engaging element 46 and the ball 382 of the limit unit 38 of the clutch shaft 30, respectively.

The structures of the axially-switchable quick release device 10 in the embodiment of the present invention are described above. The operation and advantages thereof of the axially-switchable quick release device 10 in the embodiment of the present invention are described below.

Figure 3:
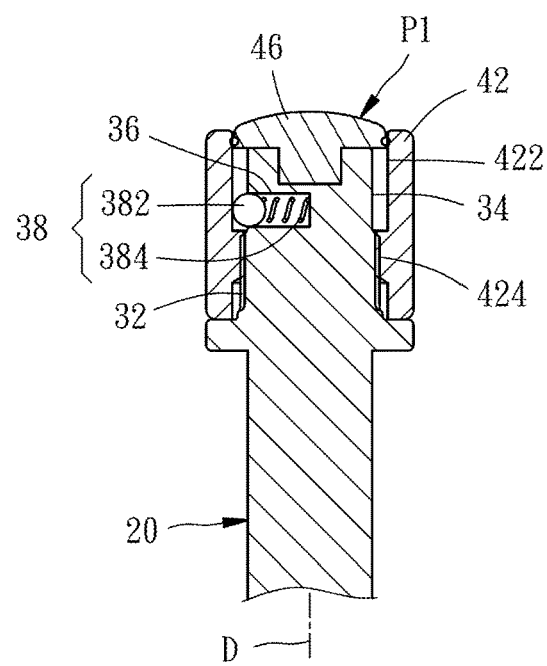
FIG. 3 is a partial cross-sectional view of the axially-switchable quick release device according to the embodiment of the present invention, showing that the fitting portion is at a meshing position.
Figure 4:
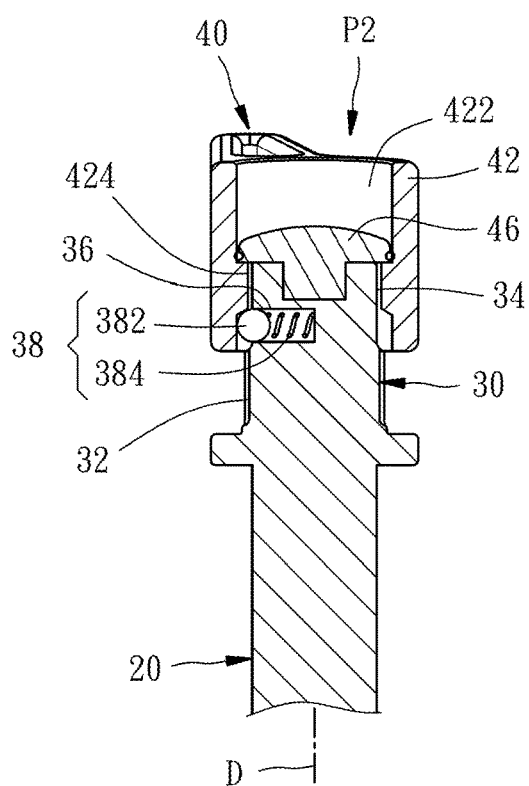
FIG. 4 is a partial cross-sectional view of the axially-switchable quick release device according to the embodiment of the present invention, showing that the fitting portion is at an idling position.

Referring to FIGS. 2-4, to start using the axially-switchable quick release device 10 of the present invention, the user inserts one end (which the axial hole 24 is disposed at) of the rod 20 into a through hole of the front (rear) fork and an axle through hole (not shown) of a wheel, allows the rod external thread 22 to mesh with the quick release nut, switches the fitting portion 42 of the quick release lever 40 to the meshing position P1 (shown in FIG. 3), and rotates the turning portion 44 of the quick release lever 40 about the axial direction D to adjust a clamping force applied by the quick release device to the two ends of the front (rear) fork. Upon completion of the adjustment of the clamping force, the user further needs to inspect the position and direction, of the turning portion 11 of the quick release lever 40. When oriented in a forward or downward direction, the turning portion 44 is likely to hit, or be caught by, any external object, causing an accident in which the bicycle topples over or the wheel loosens. To correct the direction of the turning portion 44, the user pulls the quick release lever 40 outward and therefore switches the fitting portion 42 of the quick release lever 40 to the idling position P2 (shown in FIG. 4). At this point in time, with the fitting portion 42 being at the idling position P2, the user can rotate the turning portion 44 of the quick release lever 40 to an appropriate position, for example, one that allows the turning portion 44 to be parallel on the body of the front (rear) fork. Finally, the user pushes the quick release lever 40 such that it returns to the meshing position P1, therefore finalizing the installation of the axially-switchable quick release device 10 of the present invention.

The axially-switchable quick release device 10 of the present invention is characterized in that the fitting portion 42 is switchable between the meshing position P I and the idling position P2 to enable the adjustment of the strength of the clamping force and the orientation of the turning portion 44. By contrast, a conventional quick release device is disadvantaged by the need to rotate an eccentric cam repeatedly in order to examine for an appropriate strength of the clamping force and an appropriate position of the quick release lever 40 secured in place. Therefore, the axially-switchable quick release device 10 of the present invention is easy to operate and adjust.

If the fitting teeth portion 424 of the quick release lever 40 and the meshing teeth portion 32 of the clutch shaft 30 are stripped and thus the user is unable to rotate the rod 20 and the quick release lever 40 together by turning the quick release lever 40, the user may use a hand tool (such as a hex key) engagable with the axial hole 24 of the rod 20 to drive the rod 20 to rotate and therefore separate from the quick release nut. Therefore, the axial hole 24 of the rod 20 provides a solution to a failure of the quick release lever 40.

Constituent components disclosed in the aforesaid embodiment of the present invention are illustrative of the present invention rather than restrictive of the claims of the present invention. All simple structural modifications or changes made to the embodiment, or replacement by equivalent components, without departing from the spirit embodied in the present invention, shall fall within the scope of the claims of the present invention. Accordingly, the legal protection for the present invention should be defined by the appended claims.

What is claimed is:

1. An axially-switchable quick release device, comprising:
   a rod extending in an axial direction, the rod comprising a first end and a second end opposite to the first end;
   a clutch shaft disposed at the first end of the rod and having a meshing teeth portion and an idling ring portion both of which are disposed on an outer surface of the clutch shaft; and
   a quick release lever having a fitting portion and a turning portion connected to the fitting portion, the fitting portion having a fitting teeth portion, the fitting teeth portion being sleeved onto the clutch shaft and movable between a meshing position and an idling position along the axial direction,
   wherein, when the fitting portion of the quick release lever is at the meshing position, the fitting teeth portion of the fitting portion engages with the meshing teeth portion of the clutch shaft to allow the quick release lever and the clutch shaft to rotate synchronously; when the fitting portion of the quick release lever is at the idling position, the fitting teeth portion of the fitting portion separates from the meshing teeth portion and moves to the idling ring portion to allow the quick release lever to rotate freely relative to the clutch shaft;
   wherein the fitting portion has a fitting hole penetrating in the axial direction, and the fitting teeth portion is disposed on a peripheral wall of the fitting hole;
   wherein the clutch shaft has a limit slot and a limit unit both of which are disposed on the outer circumferential surface of the clutch shaft; the limit slot is disposed between the meshing teeth portion and the idling ring portion and extends inward in a radial direction of the rod; the limit unit is received in the limit slot compressedly in the radial direction of the rod;

wherein when the fitting portion is at the meshing position, an upper edge of the fitting teeth portion gets engaged with the limit unit; when the fitting portion is in the idling position, a lower edge of the fitting teeth portion gets engaged with the limit unit.

2. The axially-switchable quick release device of claim 1, wherein the quick release lever has an engaging element having an end fixed to the clutch shaft.

3. The axially-switchable quick release device of claim 1, wherein the rod has a rod external thread disposed at the second end of the rod.

4. The axially-switchable quick release device of claim 3, wherein the rod has an axial hole which is centrally disposed at the second end of the rod and adjacent to the rod external thread and extends inward in the axial direction.

5. The axially-switchable quick release device of claim 2, wherein the rod has a rod external thread disposed at the second end of the rod.

\* \* \* \* \*